(12) United States Patent
Lacey

(10) Patent No.: US 6,651,181 B1
(45) Date of Patent: Nov. 18, 2003

(54) CLOCKING SCHEME FOR PROGRAMMABLE LOGIC DEVICE

(75) Inventor: Timothy M. Lacey, Bedford, NH (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/537,376

(22) Filed: Mar. 29, 2000

(51) Int. Cl.$^7$ ................................................ G06F 1/04
(52) U.S. Cl. ...................................... 713/503; 713/500
(58) Field of Search ................................ 713/500, 503; 714/24, 25, 31; 327/242, 258, 269

(56) References Cited

U.S. PATENT DOCUMENTS

| | | | | |
|---|---|---|---|---|
| 5,477,181 A | * | 12/1995 | Li et al. ...................... | 327/258 |
| 5,926,053 A | * | 7/1999 | McDermott et al. ......... | 327/298 |
| 6,246,275 B1 | * | 6/2001 | Wodnicki et al. ............ | 327/291 |
| 6,385,126 B2 | * | 5/2002 | Jung et al. ................... | 365/233 |

* cited by examiner

Primary Examiner—Thomas Lee
Assistant Examiner—Paul Yanchus, III
(74) Attorney, Agent, or Firm—Christopher P. Maiorana, P.C.

(57) ABSTRACT

A programmable logic device comprising a first circuit, a second circuit, and a third circuit. The first circuit may be configured to generate a first plurality of clock signals in response to (i) one or more input clock signals and (ii) a configuration signal. The second circuit may be configured to generate a second plurality of clock signals in response to (i) said first plurality of clock signals and (ii) said configuration signal. The third circuit may be configured to present a third plurality of clock signals selected from (i) said one or more input clock signals, (ii) said second plurality of clock signals in response to said configuration signal.

17 Claims, 3 Drawing Sheets

US 6,651,181 B1

CLOCKING SCHEME FOR PROGRAMMABLE LOGIC DEVICE

CROSS-REFERENCE TO RELATED APPLICATIONS

The present invention may relate to co-pending application U.S. Ser. No. 09/475,879, filed Dec. 30, 1999, which is hereby incorporated by reference in its entirety.

FIELD OF THE INVENTION

The present invention relates to programmable logic devices generally and, more particularly, to a clocking scheme for a programmable logic device architecture.

BACKGROUND OF THE INVENTION

Traditionally there are two types of programmable logic architectures: complex programmable logic devices (CPLDs) and field programmable gate arrays (FPGAs). The CPLD can be constructed as a one-dimensional array of logic blocks made of 16 macrocells and a product term array connected through a single central interconnect scheme. The CPLD achieves high performance by being able to complete a complex logic function in a single pass of the logic array and has predictable timing by connecting every output or I/O pin to every logic block input through the central interconnect structure. The CPLD can be non-volatile by using an EEPROM process.

However, the architecture of the conventional CPLD has disadvantages. A complex process technology limits performance and increases cost. A high standby power limits capacity and applications. The conventional CPLD has no available on-chip RAM. The maximum capacity of the conventional CPLD is limited by interconnect structure performance, power, technology and die cost. The core voltages, I/O voltages, and I/O standards of the conventional CPLD are not flexible. The I/O cells need a synchronous output enable (OE) to support a synchronous circuit architecture with minimal bus latency (e.g., as found in NoBL™ SRAMs manufactured by Cypress Semiconductor Corp. or ZBT™ devices manufactured by Integrated Device Technology) memory.

An FPGA architecture is constructed from a two dimensional array of logic blocks called CLBs. The CLBs are made from 4-input look-up-tables (LUTs) and flip-flops. The LUTs can be used as distributed memory blocks. The CLBs are connected by a segmented interconnect structure. The FPGA architecture supports a low standby power and the LUTs can use a simple logic CMOS process. Since the two-dimensional array of CLBs and the segmented interconnect structure are scalable, the FPGA architecture can achieve high densities.

However, the architecture of the FPGA has disadvantages. A volatile process requires a FLASH/EEPROM to be added to the design. The segmented routing architecture limits performance and makes timing unpredictable. Implementing a dual port or FIFO memory with LUTs is slow and inefficient. A complex "design-in-process" is required because the conventional FPGAs do not have predictable timing, short compile times, in-system-reprogrammability (e.g., ISR®, a registered Trademark of Cypress Semiconductor Corp.) or pin fixing. The core voltage of the conventional FPGA is (i) not flexible and (ii) driven by the current process. The conventional FPGA makes product migration very difficult and does not support full JTAG boundary scan and configuration.

Programmable logic designs generally use phased lock loops for one of two reasons: (i) to time division multiplex circuits implemented in the programmable logic device to get a higher performance with fewer device resources; or (ii) to take advantage of the positioning of the internally generated clock edges to shift performance towards improved setup, hold or clock-to-out times.

SUMMARY OF THE INVENTION

The present invention concerns a programmable logic device comprising a first circuit, a second circuit, and a third circuit. The first circuit may be configured to generate a first plurality of clock signals in response to (i) one or more input clock signals and (ii) a configuration signal. The second circuit may be configured to generate a second plurality of clock signals in response to (i) said first plurality of clock signals and (ii) said configuration signal. The third circuit may be configured to present a third plurality of clock signals selected from (i) said one or more input clock signals, (ii) said second plurality of clock signals in response to said configuration signal.

The objects, features and advantages of the present invention include providing a clocking scheme for a programmable logic device that may: (i) be spread spectrum aware; (ii) provide a lock detect signal that can be sent off-chip via an I/O pin; (iii) provide global clock signals to off-chip devices; (iv) provide de-skewing options; (v) provide a plurality of clock phases and/or (vi) support a JTAG boundary scan (including INTEST) for easy debugging.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
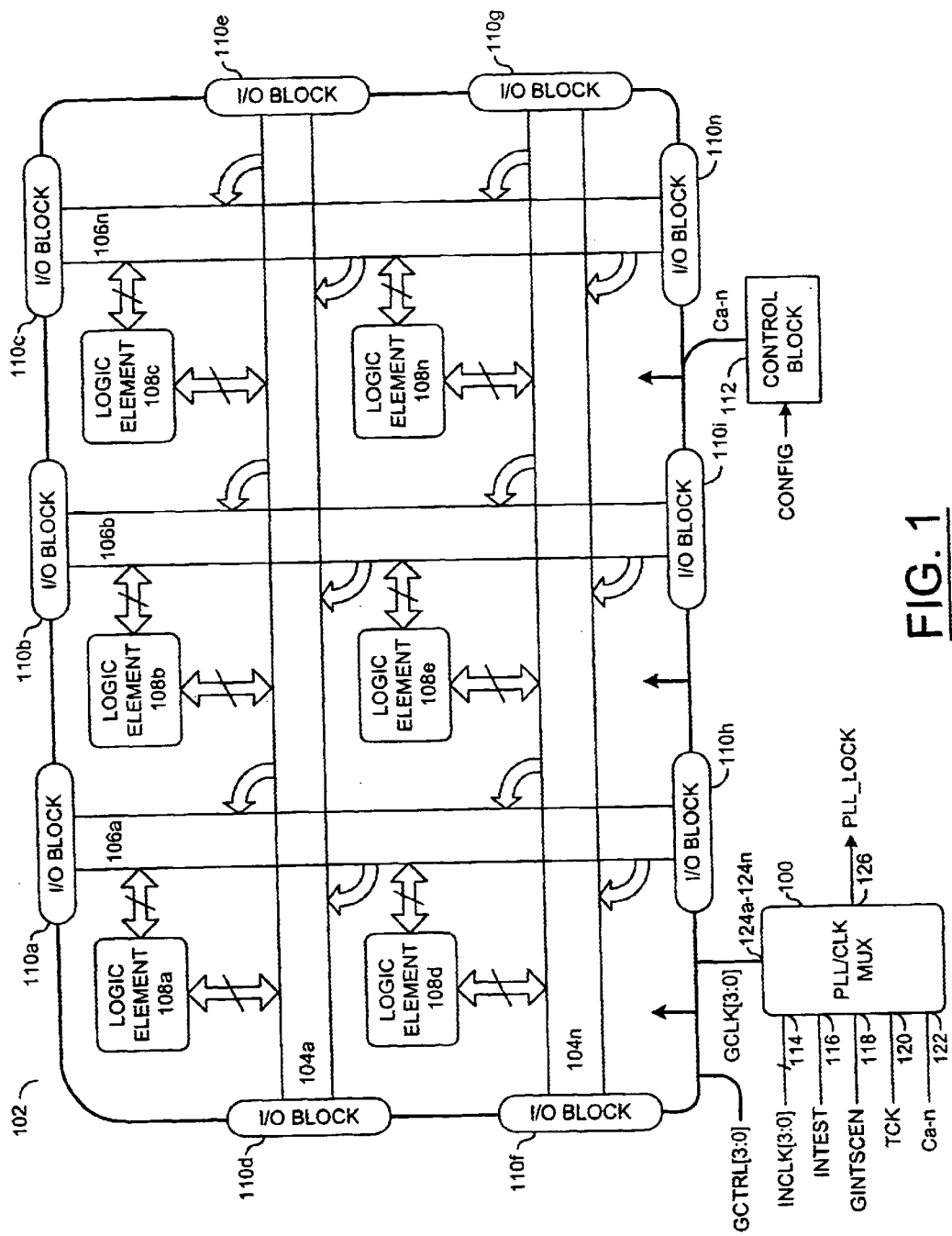
FIG. 1 is a block diagram of a PLD with a PLL/CLK multiplexer circuit in accordance with a preferred embodiment of the present invention.

Referring to FIG. 1, a block diagram of a PLL/CLK multiplexer circuit 100 is shown in accordance with a preferred embodiment of the present invention. The PLL/CLK multiplexer circuit 100 is shown implemented in the context of a programmable logic device (PLD) 102. The PLD 102 may comprises a number of horizontal routing channels 104a–104n, a number of vertical routing channels 106a–106n, a number of clusters 108a–108n, a number of I/O blocks 110a–110n, and a control block 112. The PLL/CLK multiplexer circuit 100 may have an input 114 that may receive a plurality of input clock signals (e.g., INCLK[3:0]), an input 116 that may receive a command signal (e.g., INTEST), an input 118 that may receive an enable signal (e.g., GINTSCEN), an input 120 that may receive a clock signal (e.g., TCK), an input 122 that may receive a configuration signal (e.g., $C_{a-n}$), an output 124 that may present a plurality of global clock signals (e.g., GCLK[3:0]), and an output 126 that may present a status signal (e.g., PLL_LOCK). The signals GCLK[3:0] may be generated in response to one or more of the signal INCLK[3:0], TCK, INTEST, GINTSCEN, $C_{a-n}$. The signal $C_{a-n}$ may be generated by the control block 112 in response to an input signal (e.g., CONFIG). The signal $C_{a-n}$ may be N-bits wide, where N is an integer. Each bit of the signal $C_{a-n}$ may be used as a control signal. The PLL/CLK multiplexer circuit 100 may change configurations in response to the configuration signal $C_{a-n}$. The plurality of global clock signals may be presented, in one example, to every logic element 108a–108n and I/O block 110a–110n in the PLD 102. The plurality of global clock signals may be available to every macrocell and I/O cell register in the PLD 102. The PLL/CLK multiplexer circuit 100 may be configured to present any or all of the plurality of global clock signals as a multiplied, divided, phase shifted, or de-skewed version of the signal INCLK[0].

Figure 2:
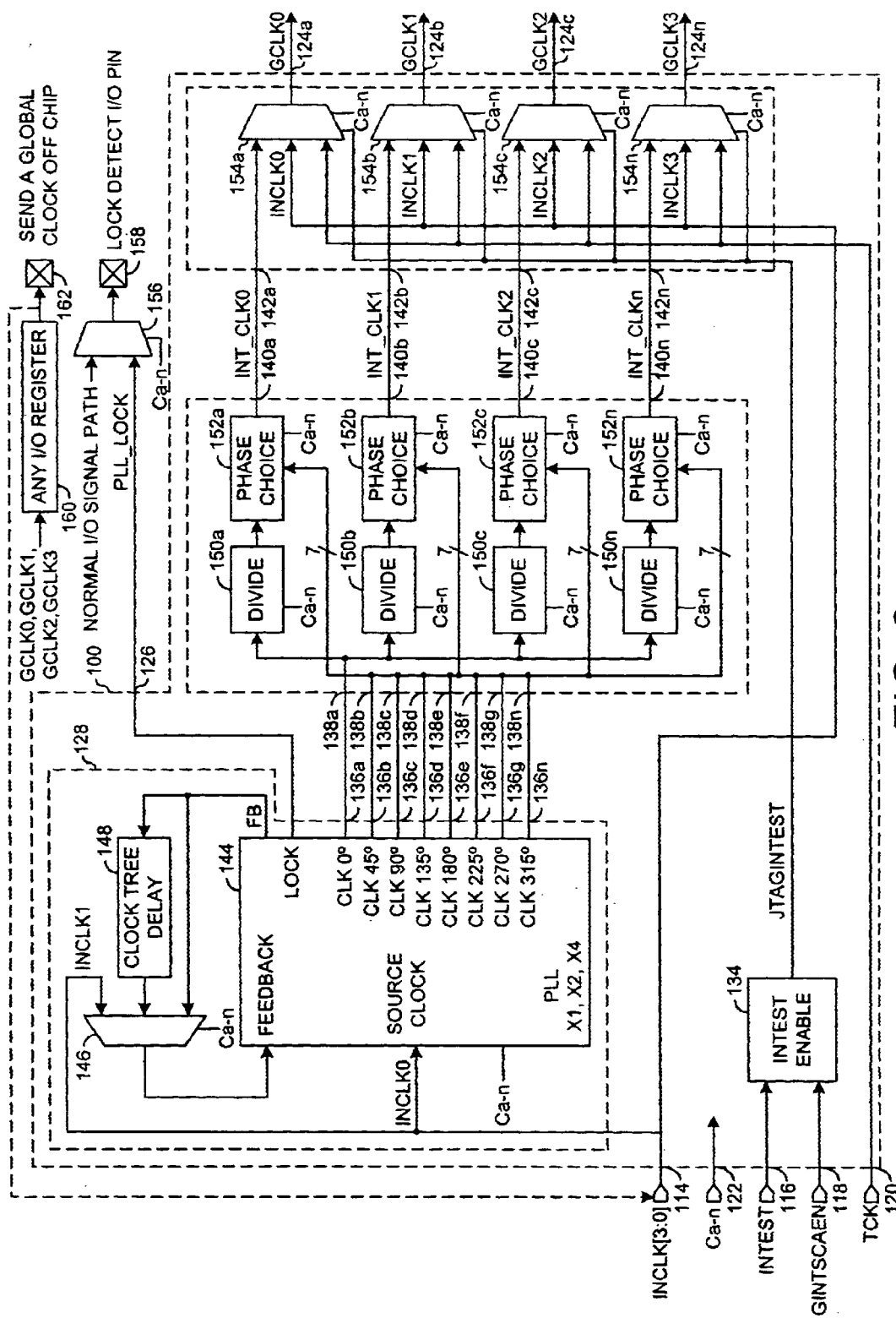
FIG. 2 is a detailed block diagram of a preferred embodiment of the PLL/CLK multiplexer circuit.

Referring to FIG. 2, a detailed block diagram of the PLL/CLK multiplexer circuit 100 is shown. The circuit 100 may comprise a circuit 128, a circuit 130, a circuit 132, and a circuit 134. The circuit 128 may be implemented, in one example, as a PLL clock generator circuit. The circuit 130 may be implemented, in one example, as a clock divider/phase selector circuit. The circuit 132 may be implemented, in one example, as a clock multiplexer circuit. The signals INCLK[3:0] are generally presented to the circuit 128 and the circuit 132. The configuration signal $C_{a-n}$ is generally presented to the circuit 128, the circuit 130, and the circuit 132. The circuit 128 may have a plurality of outputs 126a–136n that may present a plurality of clock signals (e.g., CLK_0, CLK_45, CLK_90, CLK_135, CLK_180, CLK_225, CLK_270, CLK_315, etc.) to a plurality of inputs 138a–138n of the circuit 130 and an output 140 that may present the signal PLL_LOCK. The circuit 128 may be configured to generate the signals CLK_0, CLK_45, CLK_90, CLK_135, CLK_180, CLK_225, CLK_270, CLK_315, and PLL_LOCK in response to one or more of the signals INCLK[1:0]. Each of the plurality of clock signals CLK_0, CLK_45, CLK_90, CLK_135, CLK_180, CLK_225, CLK_270, and CLK_315 will generally have a different phase. The circuit 128 may be configured to generate the plurality of clock signals having a frequency that is a multiple (e.g., X1, X2, X4, etc.) of the frequency of the signal INCLK[0]. The circuit 128 may be configured to select the multiplication factor in response to one or more bits of the signal $C_{a-n}$.

The circuit 130 may have a number of outputs 140a–140n that may present a plurality of intermediate clock signals (e.g., INT_CLK1–INT_CLKn) to a number of inputs 142a–142n of the circuit 132. The circuit 130 may be configured to generate the signals INT_CLK1–INT_CLKn in response one or more of the signals CLK_0, CLK_45, CLK_90, CLK_135, CLK_180, CLK_225, CLK_270, CLK_315 and the signal $C_{a-n}$. The circuit 130 may generate the signals INT_CLK1–INT_CLKn, in one example, by dividing the signal CLK_0 by a division factor (e.g., 1, 2, 3, 4, 5, 6, 8, 16, etc.). The circuit 130 may be configured to select a particular division factor in response to the signal $C_{a-n}$.

The circuit 132 may be configured to select from the signals INT_CLK0–INT_CLKn, INCLK[3:0], and TCK as the signals GCLK[3:0] in response to the signal $C_{a-n}$ and a control signal (e.g., JTAGINTEST). The circuit 134 may be configured to generate the signal JTAGINTEST in response to the signals INTEST and GINTSCEN.

The circuit 128 may comprise a phase lock loop (PLL) 144, a multiplexer 146, and a delay circuit 148. The signal INCLK(0) may be presented to a source clock input of the PLL 144. The PLL 144 may be configured to generate the signals CLK_0, CLK_45, CLK_90, CLK_135, CLK_ 180, CLK_225, CLK_270, and CLK_315 in response to the signal INCLK(0)and a feedback signal.

The PLL 144 may be spread spectrum aware. The PLL 144 will generally be able to track a spread spectrum input clock such that the spread spectrum may be seen in the signals CLK_0, CLK_45, CLK_90, CLK_135, CLK_ 180, CLK_225, CLK_270, and CLK_315. The multiplexer 146 may select (i) the signal INCLK(l), (ii) an output signal (e.g., FB) or (iii) a signal generated by the clock delay circuit 148 in response to the signal FB, as the feedback signal, in response to the signal $C_{a-n}$. The PLL 144 may be configured to multiply the frequency of the signal INCLK(0) by a multiplication factor (e.g., 1, 2, 4, etc.) selected in response to the signal $C_{a-n}$. The PLL 144 may be configured to generate the signal PLL_LOCK. The signal PLL_LOCK may be used to indicate when the PLL is locked.

The circuit 130 may comprise a number of divider circuits 150a–150n and a number of multiplexers 152a–152n. The signal CLK_0 may be presented to each of the dividers 150a–150n. The dividers 150a–150n may be configured to generate a signal that may be presented to an input of the multiplexers 152a–152n, respectively. The dividers 150a–150n may be configured to divide the signal CLK_0 by a division factor (e.g., 1, 2, 3, 4, 5, 6, 8, 16, etc.) selected in response to the signal $C_{a-n}$. The signals CLK_45, CLK_ 90, CLK_135, CLK_180, CLK_225, CLK_270, and CLK_315 may be presented to a respective input of the multiplexers 152a–152n.

The multiplexer 152a may select, in one example, one of the signals CLK_45, CLK_90, CLK_135, CLK_180, CLK_225, CLK_270, CLK_315, or the signal generated by divider 150a as the signal INT_CLK0 in response to the signal $C_{a-n}$. The multiplexer 152b may select, in one example, one of the signals CLK_45, CLK_90, CLK_135, CLK_180, CLK_225, CLK_270, CLK_315, or the signal generated by divider 150b as the signal INT_CLK1 in response to the signal $C_{a-n}$. The multiplexer 152c may select, in one example, one of the signals CLK_45, CLK_90, CLK_135, CLK_180, CLK_225, CLK_270, CLK_315, or the signal generated by divider 150c as the signal INT_ CLK3 in response to the signal $C_{a-n}$. The multiplexer 152n may select, in one example, one of the signals CLK_45, CLK_90, CLK_135, CLK_180, CLK_225, CLK_270, CLK_315, or the signal generated by divider 150n as the signal INT_CLKn in response to the signal $C_{a-n}$.

The circuit 132 may comprise a number of multiplexers 154a–154n. The signals INT_CLK0–INT_CLKn may be presented to a first input of the multiplexers 154a–154n, respectively. The signals INCLK[3:0] may be presented to a second input of the multiplexers 154a–154n, respectively. The signal TCK may be present to a third input of the multiplexers 154a–154n. The signals JTAGINTEST and $C_{a-n}$ may be presented to a first and a second control input, respectively, of the multiplexers 154a–154n. The multiplexer 154a may select, in one example, one of the signals INT_CLK0, TCK, and INCLK(0) as the signal GCLK(0) in response to the signals $C_{a-n}$ and JTAGINTEST. The multiplexer 154b may select, in one example, one of the signals INT_CLK1, TCK, and INCLK(1) as the signal GCLK(1) in response to the signals $C_{a-n}$ and JTAGINTEST. The multiplexer 154c may select, in one example, one of the signals INT_CLK2, TCK, and INCLK(2) as the signal GCLK(2) in response to the signals $C_{a-n}$ and JTAGINTEST. The multiplexer 154n may select, in one example, one of the signals INT_CLKn, TCK, and INCLK(3) as the signal GCLK(3) in response to the signals $C_{a-n}$ and JTAGINTEST.

The PLD 102 may have a multiplexer 156 that may select the signal PLL_LOCK or a normal I/O signal for presentation to a bonding pad 158 in response to the signal $C_{a-n}$. An I/O register 160 of the PLD 102 may be configured to select the signal GCLK(0), the signal GCLK(1), the signal GCLK (2), or the signal GCLK(3) as an output clock signal to be sent off-chip at a bonding pad 162. The I/O register may comprise, in one example, a T-type flip-flop. However, other types of flip-flops may be implemented to meet the design criteria of a particular application. The selected clock signal (e.g., GCLK(0)) may be presented to a clock input of the T-type flip-flop. The T-type flip-flop generally toggles on every clock cycle. The T-type flip-flop may produce an output clock waveform on the I/O pad 162 that is substantially half the frequency of the selected clock signal.

The signal INCLK(1) may be used as a board de-skew reference. When the signal INCLK(1) is used as a de-skew reference, one of the global clocks GCLK[3:0] may be presented via the I/O register 160 to the INCLK(l) input. The circuit 100 may provide, in one example, three options for a de-skewing delay in the feedback path of the PLL 144. The The phases of the signals CLK_90, CLK_135, CLK_180, CLK_225, CLK_270, and CLK_315 may provide, in one example, a variable amount of adjustment for the de-skewing delay. The delay increment may be determined by dividing one over the frequency of a voltage controlled oscillator (VCO) of the PLL 144 by the number of phases generated. The frequency of the VCO is generally determined by multiplying the frequency of the signal presented at the source clock input of the PLL 144 by the multiplication factor selected (e.g., 1, 2, 4, etc.) in response to the configuration signal $C_{a-n}$.

The delay of the rising edges of particular clock signals generated by the PLL 144 relative to the signal CLK_0 may be summarized as in the following TABLE 1:

TABLE 1

| DIVIDE FACTOR | PERIOD (ns) | DUTY CYCLE % | CLK_0 (ns) | CLK_45 (ns) | CLK_90 (ns) | CLK_135 (ns) | CLK_180 (ns) | CLK_225 (ns) | CLK_270 (ns) | CLK_315 (ns) |
|---|---|---|---|---|---|---|---|---|---|---|
| 1 | 4 | 40–60 | 0 | 0.5 | 1.0 | 1.5 | 2.0 | 2.5 | 3.0 | 3.5 |
| 2 | 8 | 50 | 0 | 0.5 | 1.0 | 1.5 | 2.0 | 2.5 | 3.0 | 3.5 |
| 4 | 16 | 50 | 0 | 0.5 | 1.0 | 1.5 | 2.0 | 2.5 | 3.0 | 3.5 |
| 8 | 32 | 50 | 0 | 0.5 | 1.0 | 1.5 | 2.0 | 2.5 | 3.0 | 3.5 |
| 16 | 64 | 50 | 0 | 0.5 | 1.0 | 1.5 | 2.0 | 2.5 | 3.0 | 3.5 |
| 3 | 12 | 33–67 | 0 | 0.5 | 1.0 | 1.5 | 2.0 | 2.5 | 3.0 | 3.5 |
| 5 | 15 | 20–58 | 0 | 0.5 | 1.0 | 1.5 | 2.0 | 2.5 | 3.0 | 3.5 |
| 6 | 24 | 33–67 | 0 | 0.5 | 1.0 | 1.5 | 2.0 | 2.5 | 3.0 | 3.5 | first option is generally to insert no de-skewing delay. A delay inserted in the feedback path may improve clock-to-out time while generally degrading setup time. By providing the option of no delay, the circuit 100 may avoid degrading setup time.

The second option is generally to insert a de-skewing delay that is substantially equal to a delay of the clock tree delay circuit 148. By inserting a de-skewing delay that is substantially equal to a delay of the clock tree delay circuit 148, the circuit 100 may improve the clock-to-out time by the de-skewing delay value while generally degrading the setup time by a similar amount.

The third option is generally to use the signal INCLK1 to complete a feedback loop to the PLL 144. The third option generally uses the delay in the path followed by the signal INCLK1 to de-skew the PLD 102. The third option may create a zero-delay buffer on the source clock of the PLL 144. The third option is generally only available when one of the global clock signals GCLK[3:0] is sent off-chip. In one example, a trace on a circuit board that the PLD 102 is attached to may be run from the pin 162 to other devices on the board and back to the PLD 102 as the signal INCLK[1]. The trace generally completes the feedback loop and sets the delay equal to the delay of the entire path of the trace.

The delays in TABLE 1 are generally based on a VCO frequency of 250 MHz. The delay values are the setup and clock-to-time improvement that may be realized when using the PLL 144.

Figure 3:
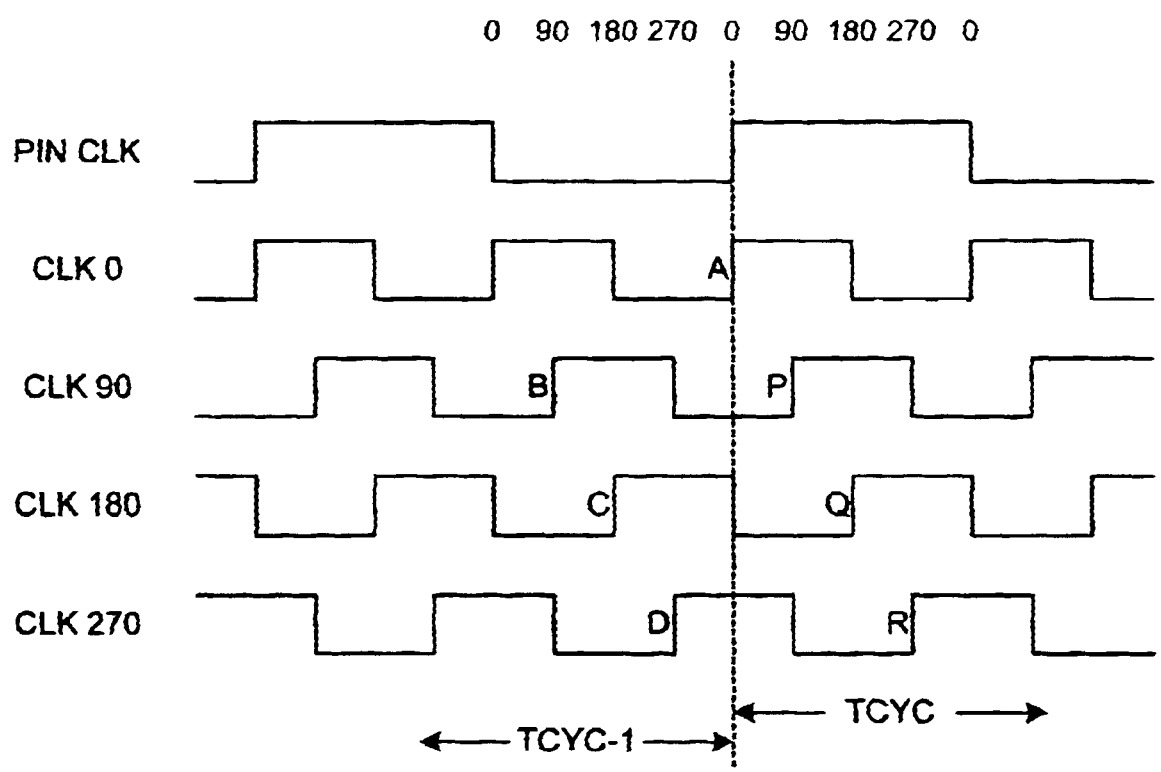
FIG. 3 is a timing diagram illustrating exemplary clock signals of the PLL/CLK multiplexer circuit of FIG. 2.

Referring to FIG. 3, a timing diagram illustrating an example of using multiple phase outputs to achieve setup or clock-to-out time improvement is shown. The waveform Pin CLK generally illustrates an example of a waveform that may be applied to the source clock input of the PLL 144. The waveforms illustrate signals that may be measured when the PLL 144 is in the 2x multiply mode, the clock tree delay is selected, and a divide by 1 option is selected. The waveform CLKO illustrates the signal GCLKO at the output 124a when the signal CLK_0 phase is selected. The waveform CLK90 illustrates the signal GCLK1 at the output 124b when the signal CLK_90 is selected. The waveform CLK180 illustrates the signal GCLK2 at the output 124c when CLK_180 is selected. The waveform CLK270 illustrates the signal GCLK3 at the output 124n when the signal CLK_270 is selected. A summary of how setup, hold, and clock-to-out times may be affected by using various clock phases of the PLL 144 may be found in the following TABLE 2:

TABLE 2

| Timing Parameter | Normal Value (ns) | De-skew Delay (ns) | B −270° | C −180° | D −90° | A 0° | P 90° | Q 180° | R 270° |
|---|---|---|---|---|---|---|---|---|---|
| Ts | 3 | 1.6 | 8.2 | 7.2 | 6.2 | 5.2 | 4.2 | 3.2 | 2.2 |
| Th | 0 | 1.3 | −3.7 | −2.7 | −1.7 | −0.7 | 0.3 | 1.3 | 2.3 |
| Tco | 6 | 1.6 | 2.0 | 3.0 | 4.0 | 5.0 | 6.0 | 7.0 | 8.0 |

Table 2 illustrates example set up, hold and clock-to-out specifications that may be realized using 4 clock outputs (e.g., ClK_O, ClK_90, ClK_180, ClK_270). The values assume a 250 MHz VCO frequency and the clock tree being deskewed. An example register not using the PLL would have ts=3 ns, tH=0 ns, and tCO=6 ns. When the clock tree delay is used to deskew the clock signals, the setup times generally increase 1.6 ns, the hold times generally improve by 1.3 ns, and the clock-to-out times generally improve by 1.6 ns. When the signal CLK_90 is selected as the output clock, there are two sets of specs that are available (e.g., B and P in TABLE 2) based on whether the clock cycle is referenced before or after the signal presented to the source clock input of the PLL 144 (e.g., the waveform Pin Clk in FIG. 3).

The circuit 100 may support the JTAG instruction INTEST by selecting the signal TCK as each of the global clock signals GCLK[3:0] during INTEST. The selection of the signal TCK as the global clock signals GCLK[3:0] generally allows the internal logic of the PLD 102 to be controlled by the JTAG clock signal TCK during INTEST.

While the invention has been particularly shown and described with reference to the preferred embodiments thereof, it will be understood by those skilled in the art that various changes in form and details may be made without departing from the spirit and scope of the invention.

What is claimed is:

1. A programmable logic device comprising:
    a phase lock loop configured to generate (a) a first plurality of clock signals, (b) a status signal and (c) an output signal in response to (i) one or more input clock signals, (ii) a configuration signal and (iii) a feedback signal;
    a second circuit configured to generate a second plurality of clock signals in response to (i) said first plurality of clock signals and (ii) said configuration signal; and
    a third circuit configured to present a third plurality of clock signals selected from (i) said one or more input clock signals and (ii) said second plurality of clock signals in response to said configuration signal.

2. The programmable logic device according to claim 1, wherein said phase lock loop is further configured to generate a control signal.

3. The programmable logic device according to claim 1, wherein said third circuit is further configured to present a test clock signal in response to an enable signal.

4. The programmable logic device according to claim 1, wherein said feedback signal is selected from a second one of said one or more input clock signals, said output signal, and a delay signal generated in response to said output signal.

5. The programmable logic device according to claim 1, wherein said feedback signal is selected in response to said configuration signal.

6. The programmable logic device according to claim 1, wherein said second circuit comprises a number of divider circuits, wherein each divider circuit comprises a division factor selected in response to said configuration signal.

7. The programmable logic device according to claim 6, wherein said division factor is selected from the group consisting of 1, 2, 3, 4, 5, 6, 8, and 16.

8. The programmable logic device according to claim 6, wherein each of said divider circuits is configured to generate a clock signal by dividing a first one of said first plurality of clock signals by said division factor.

9. The programmable logic device according to claim 1, wherein said third circuit comprises a number of multiplexer circuits.

10. The programmable logic device according to claim 1, wherein each of said first plurality of clock signals has a different phase.

11. The programmable logic device according to claim 2, wherein said control signal indicates a lock condition in said phase lock loop.

12. A circuit board comprising:
    a programmable logic device according to claim 1, wherein said circuit board is de-skewed using one of said third plurality of clock signals as one of said input clock signals.

13. A programmable logic device comprising:
    means for generating (a) a first plurality of clock signals, (b) a status signal and (c) an output signal in response to (i) one or more input clock signals, (ii) a configuration signal and (iii) a feedback signal;
    means for generating a second plurality of clock signals in response to (i) said first plurality of clock signals and (ii) said configuration signal; and
    means for presenting a third plurality of clock signals selected from (i) said one or more input clock signals and (ii) said second plurality of clock signals in response to said configuration signal.

14. A method for providing global clock signals in a programmable logic device comprising the steps of:
    (A) generating (a) a first plurality of clock signals, (b) a status signal and (c) an output signal in response to (i) one or more input clock signals, (ii) a configuration signal and (iii) a feedback signal;
    (B) generating a second plurality of clock signals in response to (i) said first plurality of clock signals and (ii) said configuration signal; and
    (C) presenting a third plurality of clock signals selected from (i) said one or more input clock signals and (ii) said second plurality of clock signals in response to said configuration signal.

15. The method according to claim 14, further comprising the step of:
    (D) presenting a test clock signal in response to an enable signal.

16. The method according to claim 14, wherein said first plurality of clock signals are generated by a phase lock loop.

17. The method according to claim 16, further comprising the step of:
    (E) generating a control signal in response to a lock condition of said phase lock loop.

* * * * *